US010492387B1

(12) United States Patent
Davison

(10) Patent No.: US 10,492,387 B1
(45) Date of Patent: Dec. 3, 2019

(54) AEROPONIC RECYCLING SYSTEM

(71) Applicant: Dewey Davison, Ft. Pierce, FL (US)

(72) Inventor: Dewey Davison, Ft. Pierce, FL (US)

( * ) Notice: Subject to any disclaimer, the term of this patent is extended or adjusted under 35 U.S.C. 154(b) by 0 days.

(21) Appl. No.: 15/845,806

(22) Filed: Dec. 18, 2017

Related U.S. Application Data

(63) Continuation-in-part of application No. 13/923,760, filed on Jun. 21, 2013, now abandoned.

(60) Provisional application No. 61/803,949, filed on Mar. 21, 2013.

(51) Int. Cl.
*A01G 31/00* (2018.01)

(52) U.S. Cl.
CPC ........ *A01G 31/00* (2013.01); *A01G 2031/006* (2013.01)

(58) Field of Classification Search
CPC ....... B05B 7/0483; B05B 7/0408; B05B 7/04; B05B 7/0416; A01G 25/02; A01G 25/16; A01G 27/005; A01G 27/006; A01G 31/02; A01G 31/06; A01G 9/02; A01G 31/00; A01G 2031/006
USPC ............ 47/59 R, 62 R, 62 C, 62 N; 239/398, 239/428.5, 433, 434
See application file for complete search history.

(56) References Cited

U.S. PATENT DOCUMENTS

| | | | | | |
|---|---|---|---|---|---|
| 3,801,020 | A * | 4/1974 | Mocarski | B05B 1/005 | 239/417.3 |
| 4,059,922 | A * | 11/1977 | DiGiacinto | A01G 31/06 | 47/59 R |
| 4,332,105 | A * | 6/1982 | Nir | A01G 31/02 | 137/563 |
| 4,514,930 | A * | 5/1985 | Schorr | A01G 31/02 | 47/60 |
| 4,555,059 | A * | 11/1985 | Collins | B05B 7/063 | 239/425 |
| 4,776,515 | A * | 10/1988 | Michalchik | A61L 9/14 | 239/3 |
| 5,440,836 | A * | 8/1995 | Lee | A01G 31/06 | 47/59 R |
| 7,389,941 | B2 * | 6/2008 | Jackson | B05B 5/03 | 134/7 |
| 2004/0222321 | A1 * | 11/2004 | Golan | A01G 25/02 | 239/542 |
| 2007/0113472 | A1 * | 5/2007 | Plowman | A01G 31/02 | 47/62 A |
| 2009/0126269 | A1 * | 5/2009 | Wilson | A01G 31/00 | 47/62 R |

(Continued)

*Primary Examiner* — Lisa L Tsang
(74) *Attorney, Agent, or Firm* — Glenn E. Gold, P.A.; Glenn E. Gold

(57) ABSTRACT

An aeroponic recycling system for propagating and growing plants includes a housing having a housing body defining an interior space for retaining a quantity of nutrient-rich water and a container lid having at least one opening for seating a container holding a plant to be nourished by the nutrient-rich water. At least one aeroponic mister is located within the housing interior and includes an air inlet, an air inlet body having an aperture extending completely through a sidewall thereof for receiving the nutrient-rich water, and a misting discharge orifice. The aeroponic mister is configured to combine, or mix, the nutrient-rich water and air for expulsion of a nutrient-rich water mist through the mister misting discharge orifice and toward exposed plant roots. An air pump provides a selectively flow of air through the system.

7 Claims, 11 Drawing Sheets

(56) References Cited

U.S. PATENT DOCUMENTS

| | | | | |
|---|---|---|---|---|
| 2009/0293357 | A1* | 12/2009 | Vickers | A01G 31/02<br>47/62 A |
| 2011/0023359 | A1* | 2/2011 | Raring | A01G 31/02<br>47/62 A |
| 2011/0056132 | A1* | 3/2011 | Gardner | A01G 9/16<br>47/62 R |
| 2012/0005957 | A1* | 1/2012 | Downs, Sr. | A01G 31/02<br>47/62 A |
| 2012/0085026 | A1* | 4/2012 | Morris | A01G 31/06<br>47/62 A |
| 2012/0090236 | A1* | 4/2012 | Orr | A01G 31/02<br>47/62 A |
| 2018/0368346 | A1* | 12/2018 | Watson | A01G 31/06 |

* cited by examiner

AEROPONIC RECYCLING SYSTEM

CROSS-REFERENCE TO RELATED APPLICATION

This U.S. non-provisional patent application is a continuation-in-part of co-pending U.S. non-provisional patent application Ser. No. 13/923,760, having a filing date of Jun. 21, 2013, which, in-turn, claims the benefit of U.S. provisional patent application No. 61/803,949, having a filing date of Mar. 21, 2013, both of which are hereby, incorporated-by-reference herein in their entireties.

FIELD OF THE INVENTION

The present disclosure generally relates to apparatuses and methods for aeroponic growth of plants. More particularly, the present disclosure relates to an aeroponic misting apparatus and recycling aeroponic watering system for growing plants in an aeroponic system.

BACKGROUND OF THE INVENTION

There are numerous systems for growing plants. Traditional plant growing systems that rely on soil or similar mediums are classified as geoponics. However, as is well known, soil is not actually required to grow plants. For example, a hydroponic system eliminates the need for soil and instead utilizes water containing essential nutrients as the growth media. Hydroponic systems can be more efficient than geoponic systems, as plants find it easier to take in nutrients from water than from soil and plant growth can be controlled by the nutrients made available to the plants. Aeroponic systems, which are less well known, go a step further by growing plants in an air and water mist environment.

In an aeroponic system, hanging plant roots are bathed in a nutrient-rich mist in a controlled and isolated environment. In this type of system, cultivators are not only able to have complete control of the nutrients supplied to the roots (i.e. the nutrient intake), but they are also able to allow the hanging plant roots to grow larger and to more easily absorb the nutrients and oxygen being supplied. There is also a reduced chance of root zone disease since there is no material for debris or pathogens to reside upon.

However, implementing an aeroponic system presents certain challenges to ensure the system provides complete control of nutrient intake. Many aeroponic systems are cumbersome and highly wasteful of nutrients. For an aeroponic system to be successful it is necessary that the system provide a consistent flow, or mist, of the nutrient solution to the root system of the plants. As is well known in the aeroponic industry, there are two general types of aeroponic systems: High Pressure Aeroponic (HPA) systems and Low Pressure Aeroponic (LPA) systems. High Pressure Aeroponic systems are much more complex than LPA systems because HPA systems are designed to produce a mist of atomized air (i.e., extremely tiny droplets on the order of 20-50 micrometers, or microns, emitted from relatively expensive machined mist heads on the order of 20-50 micrometers. Due to the microscopic diameter of the HPA system mist head apertures, great pressure must be exerted to drive nutrient solution through the mist heads. Commonly, this requires the use of a diaphragm pump, such as a reverse osmosis pump, requiring a pressure output on the order of about 80-150 psi. The high pressure is required to atomize the nutrient solution by driving it through a tiny spray nozzle. Such conventional HPA systems operate for brief time periods (i.e. commonly on the order of seconds) separated by relatively long time intervals. In stark contrast, low pressure aeroponic (LPA) systems such as the aeroponic recycling system of the present invention produce a continuous spray of nutrient solution drops in the form of a mist 308 directed toward the exposed plant roots. While both systems may produce a mist, it is well understood in the field that each pressure system has a unique mode of operation resulting in very different outcomes. In particular, a high pressure system produces a fog, or a fine mist, while a low pressure system produces droplets or spray. High pressure systems use high water pressure oftentimes supplied by a compressed air system, wherein the compressed air is funneled, or otherwise driven, through a misting apparatus to create a very fine nutrient mist, or a fog. High pressure systems are very sophisticated, expensive and oftentimes subject to clogging, requiring constant maintenance. In fact, advanced micron filters are commonly used in combination with the compressed air to attempt to prevent or at least minimize clogging. However, it is not uncommon for the filter to ultimately become clogged and the problem to persist.

Low pressure systems, on the other hand, are still able to provide a mist to the plant root system, while operating in a very different manner than their high pressure system counterparts. A lower pressure system generally includes an electric water pump that sprays a nutrient solution, much like a lawn sprinkler system. The water pump creates the necessary pressure to force the nutrient solution through a mister and/or sprinkler head, where the water is broken down into water droplets that are sprayed onto the plant roots. Housing an electric water pump within a nutrient-filled liquid environment introduces a great risk of electrical shock to handlers of aeroponic systems. Furthermore, the inclusion of water pumps within such a contained environment results in the generation and undesirable transfer of heat to the volume of water contained within the housing. As the water temperature increases, bacterial growth increases and the resulting bacteria in the water increase clogging of the solution within both the water pump and the mister, not to mention diminished water quality. While both low- and high-pressure systems have uniquely different configurations and methods of operation, they both require a great degree of surveillance/care and maintenance.

In order to properly aerate the nutrient solution being used, low pressure systems require the incorporation of an air pump that generally includes an air stone to gradually diffuse air into the system and maintain proper oxygen levels. However, the water pumps that are conventionally used are commonly located within the same contained environment as the plants themselves. As a result, it is not uncommon for the temperature of the water-based nutrient solution to increase as the water solution functions as a heat sink to cool the water pump during operational use. This increased temperature creates a breeding ground for bacterial growth within the system making the pump system as a whole (e.g. pump and mister) more susceptible to clogging. Furthermore, increased nutrient solution temperature also functions to negatively impact nutrient quality, which, in-turn, negatively affects the root systems of the plants. Furthermore, these types of low pressure systems are known to produce undesirable electrical shock to those handling them as electrical components are in close proximity to the contained liquid solution.

Accordingly, there remains a need in the art for an improved aeroponic system that overcomes at least the aforementioned drawbacks, disadvantages and limitations of known aeroponic systems. In that regard, there has been a long-standing, as-of-yet unmet, need in the aeroponic industry for an aeroponic system that is less cumbersome than conventional systems, and incorporates a streamlined configuration/design that provides an enhanced plant root nutrient intake. It would be highly desirable to provide such a system that not only encourages more efficient use of the supplied nutrients, but also reduces the risk of electrical shock to system users and is less susceptible to clogging or undesirable heat exchange between, for example, a water pump and the typically-contained water. Preferably, such an aeroponic system would recycle unused nutrients while maintaining the cleanliness of the aeroponic device. An ideal system would be easy to manufacture and could be constructed at low cost using commonly available materials and efficient assembly practices.

SUMMARY OF THE INVENTION

The present invention, alternatively referred to by its trade name, the DEWEY MISTER, overcomes many of the deficiencies of the known art and the aforementioned problems that remain unsolved. For example, it eliminates the need for a water pump, which, in turn, significantly reduces the occurrence of system clogging, equipment-to-water heat transfer, and electrical shock to the cultivator. The present invention also eliminates the need for an air stone or the like to aerate the nutrient solution, eliminates the need for expensive equipment, such as high-pressure compressed air pumps and/or tanks (i.e. in high-pressure systems) required for atomizing air into a nutrient solution to provide a fog. The present system further eliminates the need for advanced micron filtration systems used to minimize or prevent clogging. The present invention, which is not a high-pressure system and does not require the use of high pressure or compressed air, does not produce a corresponding fog. The inventive aeroponic system produces droplets similar to those produced by conventional low pressure systems; however, without necessitating the use of a water pump or an air stone. The present system has a construction, configuration an design, that is highly adaptable for being easily manufactured at low cost using commonly available materials and existing efficient assembly practices.

The present disclosure is generally directed to an aeroponic recycling system for propagating and growing plants. The system includes a housing defining a watertight cavity, wherein a volume of nutrient-rich water is stored within the cavity. At least one aeroponic mister is positioned internally within the housing. The aeroponic mister includes an air inlet for receiving air, a mixing chamber body defining a water inlet aperture for receiving the nutrient-rich water, and a misting discharge orifice, wherein the aeroponic mister is configured to effectively combine the nutrient-rich water and air into a quantity of nutrient-rich water mist for efficient expulsion through the misting discharge orifice. The system preferably includes at least one container supported by the housing and positioned within the housing and supported above an aeroponic mister. The system further includes at least one plant provided in a plant container. An air pump is mounted outside of the housing to provide an air flow to the mister, and a hose interconnects the air pump with the air inlet of the aeroponic mister. Furthermore, the body of the aeroponic mister preferably has a geometry supporting its function as an expansion chamber, wherein the aeroponic mister body is interposed between the air inlet and the misting discharge orifice. In other words, the aeroponic mister generally includes two primary elements; a lower base functioning as an air intake chamber and an upper expansion chamber in fluid communication with the air intake chamber, wherein the air intake chamber receives a flow of air via an inlet tube, which is communicated into an expansion chamber inlet for subsequent expulsion through an expansion chamber convergent inlet transitioning into a divergent, or outwardly flared, misting discharge orifice. Furthermore, the flow of air is mixed with nutrient-rich water received through the water inlet aperture provided through the sidewall of the expansion chamber.

In an aspect, an upper surface of the volume of nutrient-rich water is maintained at a level above the water inlet aperture of the expansion chamber.

In another aspect, the misting discharge orifice may comprise a nozzle.

In another aspect, the nozzle may include a convergent inlet, a divergent misting discharge orifice, and a throat between the convergent inlet and the divergent misting discharge orifice, wherein the throat has a diameter less than the corresponding diameters of the convergent inlet and the divergent misting discharge orifice.

In another aspect, the aeroponic mister may include a lower chamber attached to the air inlet and having a hose connected to an inlet of the lower chamber.

In another aspect, the air inlet may be integrated, or interposed, between the expansion chamber and the lower chamber, and the air inlet may further comprise a threaded fitting.

In another aspect, the housing may include at least one aperture extending into a housing bottom, such that the housing aperture is sized, shaped and otherwise configured for receiving the threaded fitting therethrough in order to form a watertight seal and support the aeroponic mister in a generally vertically upright orientation.

In yet another aspect, the bottom of the housing may include a plurality of housing apertures extending therethrough, wherein each of the housing apertures receives a threaded fitting of the aeroponic mister therethrough, such that the plurality of housing apertures and the aeroponic misters received therethrough are arranged in combination to provide a desired quantity of nutrient rich mist sufficient to provide nutrient rich mist to each plant.

In a still another aspect, the housing may include at least one aperture extending through a bottom thereof, such that an aeroponic mister can be inserted through the bottom of the housing and sealed with a rubber grommet, providing a water tight seal between the mister and the base body and supporting the aeroponic mister in a vertical position.

In another aspect, the system may further include a stabilizing plate affixed to a bottom of the expansion chamber, wherein the stabilizing plate has a diameter substantially larger than a corresponding diameter of the expansion chamber.

In a further implementation, an aeroponic mister for use in an aeroponic recycling system of the type having a housing containing a volume of nutrient rich water and at least one container supported by the housing, may be provided including: an air inlet, a body adapted to receive an airflow through the air inlet and defining a water inlet aperture adapted to receive the nutrient-rich water, and a nozzle configured to expel a nutrient-rich water mist through a misting discharge orifice. The water inlet aperture may be integrated, or interposed, between the air inlet and the misting discharge orifice.

In another aspect, the aeroponic mister body may be shaped, or have a geometry, encouraging its function as an expansion chamber, wherein the aeroponic mister body is integrated, or interposed, between the air inlet and the nozzle.

In a further aspect, the nozzle may include a convergent inlet, a divergent misting discharge orifice, and a throat intermediate of the convergent inlet and the divergent misting discharge orifice, wherein the throat has a diameter less than corresponding diameters of the convergent inlet and the divergent misting discharge orifice.

In another aspect, the aeroponic mister may include a lower chamber affixed to the air inlet and including a lower chamber inlet for integrating an air hose therewith.

In another aspect, the air inlet may be integrated between the expansion chamber and the lower chamber, and the air inlet may further comprise a threaded fitting.

In another aspect, the aeroponic mister may further include a stabilizing plate affixed to a bottom of the expansion chamber, the stabilizing plate having a diameter substantially greater than a corresponding diameter of the expansion chamber.

In another aspect, a method of growing plants aeroponically includes: (a) acquiring an aeroponic recycling system of the type having a housing containing a volume of nutrient rich water, at least one aeroponic mister positioned within the housing and having an air inlet, a water inlet aperture configured to receive the nutrient rich water and a venturi-type nozzle misting discharge orifice, and an air pump connected to the air inlet, wherein the air pump is positioned external to the housing; (b) suspending at least one container above the mister containing a plant having plant roots to be grown in the container in a such a manner as to expose the plant roots to the aeroponic mister; (c) providing a flow of nutrient rich water received through the water inlet aperture in the aeroponic mister, with a continuous airflow pumped into the aeroponic mister inlet; (d) intermixing the pumped airflow and nutrient rich water within the aeroponic mister; and (e) expelling the intermixed air and nutrient rich water through the venturi-type nozzle misting discharge orifice as a mist. Preferably, the mist is directed at the plant roots; thereby coating the plant roots with the mist with any excess mist is allowed to drain off of the plant roots and remix with the volume of nutrient rich water.

In another aspect, the step (a) of acquiring an aeroponic recycling system may further comprise providing a mister having a body shaped, or having a geometry, to support its function as an expansion chamber, wherein the mister body is integrated, or interposed; between the air inlet and the nozzle misting discharge orifice.

In another aspect; the step (a) of acquiring an aeroponic recycling system may further comprise providing a mister including a stabilizing plate affixed to a bottom of the expansion chamber, the stabilizing plate having a diameter substantially greater than a corresponding diameter of the expansion chamber.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
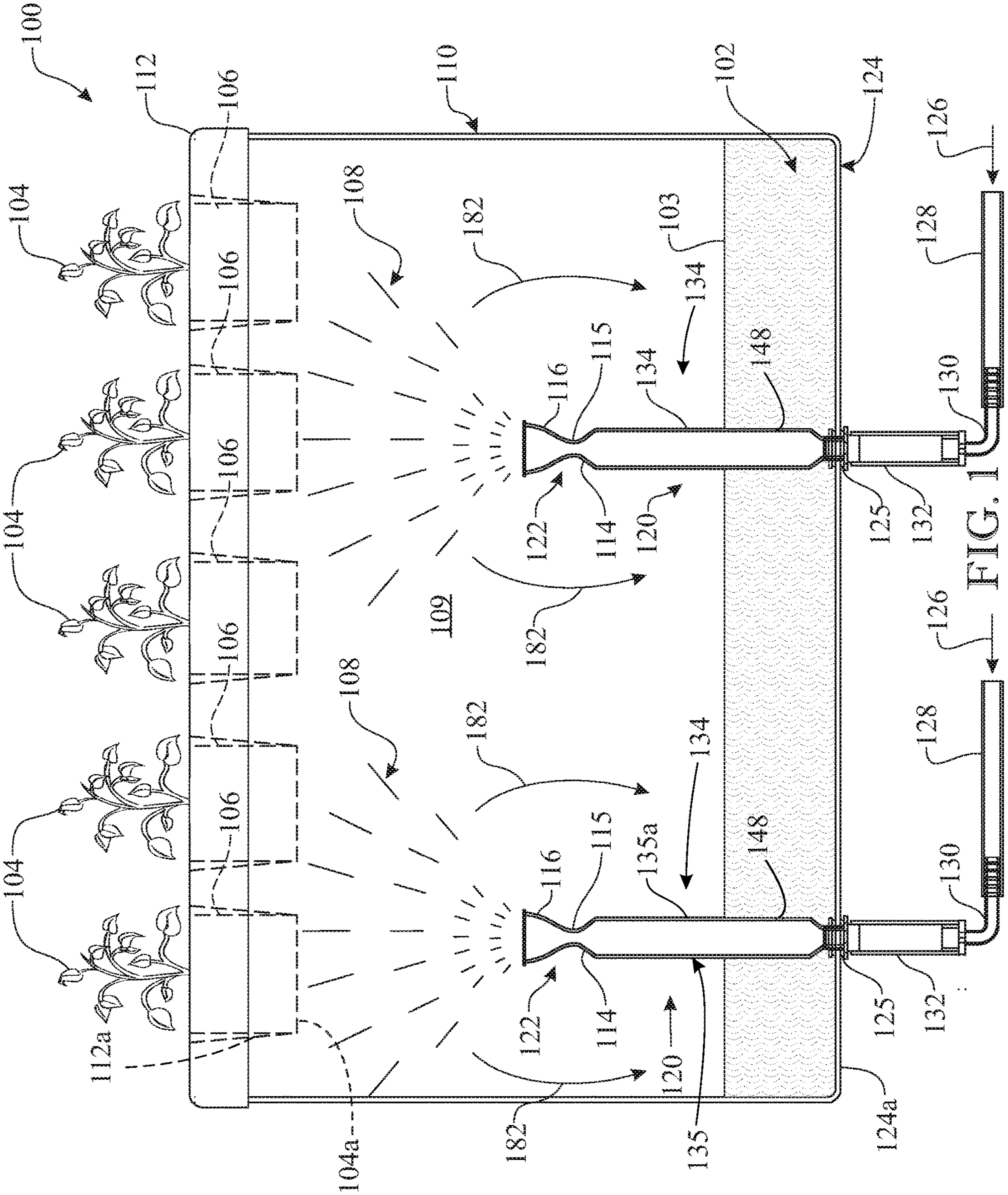
FIG. 1 presents an elevation view of an aeroponic system embodying the present invention, wherein misting nozzles are positioned in a housing for misting the root structure of plants suspended at a top of the housing.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-4, in accordance with an exemplary implementation of the invention, a low pressure aeroponic recycling system, shown generally as reference numeral 100, is shown along with its various primary components. The system 100 incorporates a housing, shown generally as reference numeral 110, which is preferably provided having a rectilinear geometry including a removable top 112, and is constructed having fluid integrity to retain a quantity, or volume, of nutrient rich-water 102 therein. The removable top 112 is sized, shaped, and otherwise configured to support a plurality of containers 106, each holding a respective one of a plurality of individual plants 104 in such a manner that at least a portion of the corresponding plant root system is maintained exposed within a watertight interior space 109 of the housing 110, positioned to receive and absorb a partial quantity of a continuous nutrient-rich water mist 108 emitted by one or more aeroponic misting devices, or aeroponic misters 120, integrated into, or otherwise supported by, a housing bottom 124. In accordance with this first exemplary implementation, and as shown in the representative depictions of FIGS. 1-4, the housing bottom 124 is preferably in the form of a horizontally-oriented planar panel incorporating one or more apertures 125 (FIGS. 1 and 4), each provided to enable and facilitate the integration of a corresponding one of the respective quantity of misters 120 with the housing bottom 124, with each of the apertures 125 having a single aeroponic mister 120 extending vertically-upwards therethrough. With the aeroponic recycling system 100 in a fully-assembled state, each of the aeroponic misters 120 extends upward through a respective aperture 125 in the housing bottom 124 in a manner—as described in greater detail hereinbelow—maintaining a vertical aeroponic mister orientation, and a spacing between adjacent misters enabling nutrient-rich water mist 108 to be exuded, or discharged, by the aeroponic misters 120 to effectively reach the roots exposed through the bottoms of the corresponding plurality of containers 106 supported by the removable top 112. In other words, this configuration enables the user to define the aeroponic mister locations and aspects of the mist generation in order to provide maximum exposed root surface mist coverage.

Figure 2:
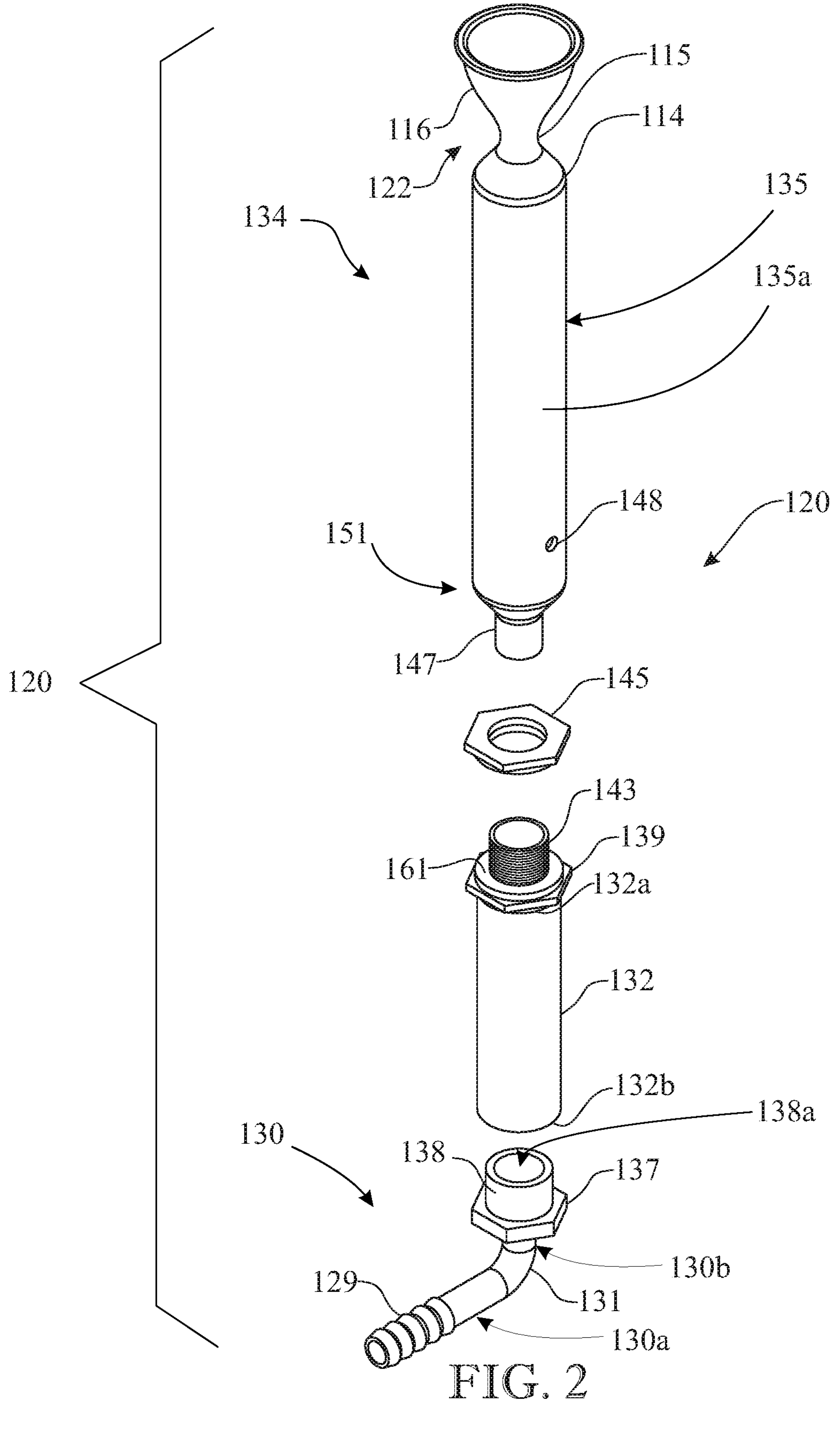
FIG. 2 presents an exploded elevation view of a nozzle utilized for misting the root structure.

Each aeroponic mister 120 has an inlet tube 130 including a connection barb 129 at one end for the sealing attachment of an open end of an airflow conduit, or tube, and a flange 137 extending radially outward from an exterior surface of a male fitting 138 in the form of a cylindrical wall at an opposite end, as best shown in FIG. 2. The inlet tube 130 can be straight, bent up to approximately a ninety degree (90°) angle (as illustrated) or have any other shape/geometry adequate to accommodate the particular configuration of the system 100 desired by the user. A lower air-intake chamber, shown generally as reference numeral 132, preferably has a cylindrical shape, or geometry, and has a lower end **132*b* mated with the male fitting 138, which is closely received through the lower end of the lower air-intake chamber. The inlet tube 130 and the lower chamber 132 are preferably fabricated of a plastic material, such as polyvinyl chloride (PVC). The inlet tube 130 and lower chamber 132 are preferably attached to one another by any known suitable means, including, but not limited to, a chemical bonding agent or a thermal weld to create a connection that is impervious to fluid leakage while maintaining an unimpeded internal fluid flow passage. The lower chamber 132 includes a flange 139 and an externally-threaded male fitting 143, both of which are preferably positioned at an upper end 132*a* of the lower chamber 132. The upper end 132*a* is located opposite of the lower end 132*b* of the lower chamber 132, wherein the lower end receives the male fitting 138 of the inlet tube 130 (FIG. 2). A resilient seal 161, preferably constructed of rubber or polyurethane, is received over the threaded male fitting 143 and is seated upon the flange 139. The threaded male fitting 143 extends through a respective aperture 125 (FIG. 1) in the housing bottom 124 such that the seal 161 bears against the bottom surface 124*a* of the housing bottom 124. A female internally-threaded fitting 145 is threaded onto the male externally-threaded fitting 143 and torqued so that the seal 161 is compressed against the exterior surface 124*a* of the housing bottom 124 to maintain the fluid integrity of the housing 110**.

At a lower end 151, the cylindrical expansion chamber 134 has a lower air inlet 147 having an external diameter nominally less than a corresponding internal diameter of threaded male fitting 143 such that the air inlet is closely received within the male threaded fitting of the lower air intake chamber 132 and is secured therein, for example, by bonding using a chemical adhesive or thermal welding process to form a connection that is impervious to fluid leakage while maintaining an unimpeded internal fluid flow passage. The lower air inlet 147 has an internal diameter that is less than the corresponding internal diameter of the sidewall **135*a* of the central body 135 of the expansion chamber 134. The sidewall 135*a* of the central body 135 of the expansion chamber 134 further defines a water inlet aperture 148 in a lower portion 151 thereof, which is located below the surface level 103 of the nutrient-rich water solution 102 in the interior of the housing 110 such that the expansion chamber 134 is in fluid communication with the water solution 102 via its water inlet aperture 148**.

A nozzle 122 extends upwardly from the top of the expansion chamber 134 (i.e., above central body 135). The nozzle may be separately attached to or integrally formed with the expansion chamber central body 135. The nozzle 122 has a convergent inlet 114 having a diameter equal to the internal diameter of central body 135 of the expansion chamber 134, as best shown in FIG. 2. The convergent inlet 114 extends upwardly from an edge of the expansion chamber 134, with a continuously reduced internal diameter to form a throat 115, or necked region, having an internal diameter less than the inner diameter of the expansion chamber 134. A divergent misting discharge orifice 116 extends upwardly from the throat section 115, having a progressively-expanding internal diameter and positioned above the throat 115. The configuration of nozzle 122 enables fluid to flow through a convergent inlet 114, into the throat 115, and, finally, through the divergent misting discharge orifice 116, as described above.

Figure 3:
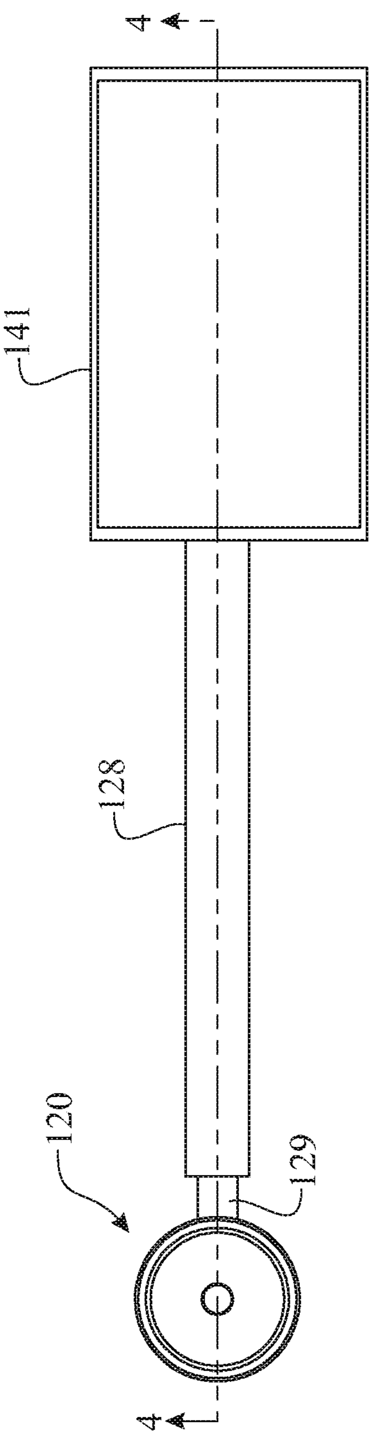
FIG. 3 presents a top plan view of the air pump and nozzle.
Figure 4:
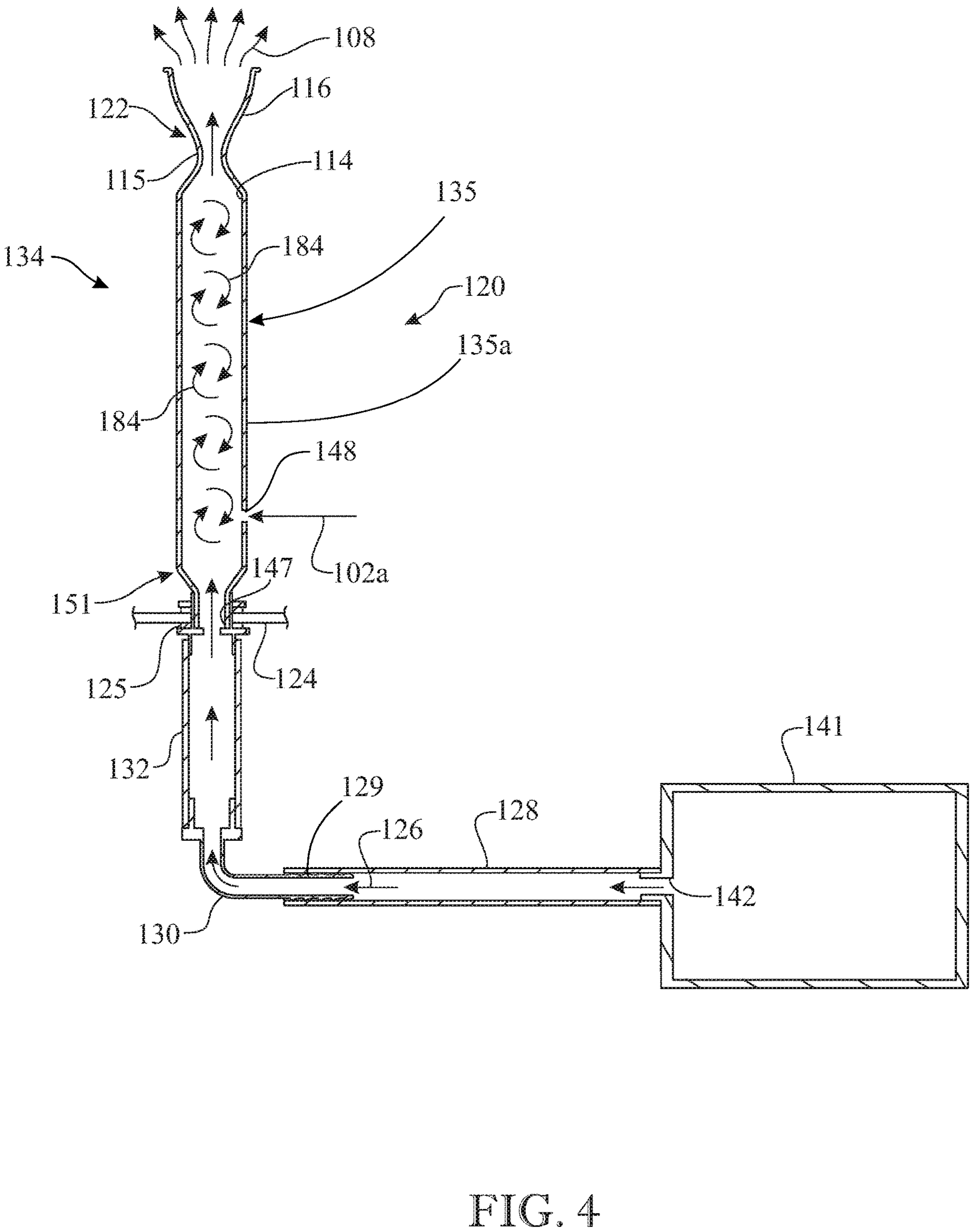
FIG. 4 presents a cross-sectional view of the air pump and nozzle shown in FIG. 3, the section being taken along section line 4-4, FIG. 3.

The mister 120 is pneumatically interconnected to and communicative with an air pump 141 via an air tube 128, as best shown in FIGS. 3 and 4. The air tube 128 is preferably flexible and may include some resilient characteristics such that an end of the air tube 128 can be sleeved over and snugly received about the connection barb 129 of the inlet tube 130. The connection barb 129 and the air tube 128, together, define a connection that provides a fluid seal of the internal passageway between the interior of air tube 128 and the interior of inlet tube 130. An opposite end of the air tube 128 is connected to an outlet 142 of the air pump 141.

In operation, the aeroponic recycling system 100 is configured with at least one aeroponic mister 120 vertically-oriented and mounted through the bottom 124 of the housing 110, as best shown in FIGS. 1 and 4. At least one container 106 is provided to support the at least one plant 104 in such a manner that the roots **104*a* (FIG. 1) of the plant 104 are exposed to an interior of the housing 110. Referring now primarily to FIG. 1, a plurality of misters 120 may be integrated with the bottom 124 of the housing 110 with the misters 120 extending through corresponding housing bottom apertures 125 therein. Preferably, each mister 120, or misting subassembly, is mounted in a vertical orientation, perpendicular to bottom side 124 of housing 110. Each of the plurality of misters 120 introduces a quantity, or volume, of nutrient-rich water solution 102 into the interior of the housing 110, as represented by nutrient-rich water mist 108 (e.g. see FIG. 1), while the surface level 103 of the nutrient-rich water solution 102 is maintained above the corresponding water inlet apertures 148, but below the divergent misting discharge orifices 116, of the respective misters 120. Significantly, air pump 141 (FIG. 3) is preferably located exteriorly of the housing 110, and is preferably positioned such that the air pump outlet 142 is vertically higher than, or above, the surface level 103 of the water solution 102**.

During operation of the aeroponic misting system 100, airflow, identified generally by flow direction arrow 126, is generated by the air pump 141, wherein the airflow evacuates any water solution 102 that may have accumulated within the misters 120 and within the air tubes 128. Upon commencing operation of the air pump 141, and evacuation of any accumulated water solution 102, a constant, or steady, airflow 126 is maintained by the air pump. The water inlet aperture 148 extending completely through sidewall 135*a* of central body 135 of expansion chamber 134 enables and facilitates the controlled introduction of nutrient-rich water solution 102 through water inlet aperture 148 of expansion chamber 134. In other words, the water inlet aperture 148, or opening, just below the expansion chamber 134 allows the nutrient-rich water solution 102 to trickle into the chamber, and ultimately blown out of through the discharge orifice 116. The diameter of the water inlet aperture 148 may be used to control the volumetric flow of the water solution 102 into the expansion chamber 134 in a manner clearly understandable to an individual skilled in the art of fluid dynamics. As the airflow 126 exits the expansion chamber inlet 147, the airflow 126 begins to swirl, as indicated by the arrows 184 in FIG. 4, and thereby mix with the controlled ingress of nutrient-rich water solution 102 entering through the water inlet aperture 148. The combined airflow 126 and water solution 102 is communicated vertically upward through the central body 135 of the expansion chamber 134 toward the nozzle 122. The airflow 126 and water solution 102 mixture enters convergent inlet 114 of nozzle 122, and subsequently flows through the nozzle throat 115—alternatively referred to as the "neck" or "choke"—thereby, increasing the velocity, or rate, of flow of the mixture, while concurrently decreasing the pressure of the mixture flow constricting the air/water mixture during passage through the narrowed throat 115, and subsequently expanding the mixture during passage through the divergent misting discharge orifice 116, causing the creation of a mist 108 comprised of the airflow 126 and small droplets of the water solution 102. The mist 108 is directed in a vertically-upward direction in the form of an inverted conical pattern toward the exposed root structures 104*a* of the plants 104 for absorption by the roots; thereby, providing the plants 104 with the desired nutrients required for optimal plant growth. Any excess nutrient-rich water solution 102 from the mist 108 (i.e., any solution 102 not absorbed or otherwise retained by the roots) descends toward the housing bottom 124 and falls back into the body of nutrient-rich water solution 102, as represented by directional arrows 182, where it may be recycled for subsequent us by the aeroponic recycling system 100.

The exemplary aeroponic recycling system 100 of the present invention incorporates several advantageous features vis-à-vis conventional aeroponic systems. For example, there are no electrical components maintained within the housing 110, thereby greatly reducing the risk of electrical shock, a common risk associated with many existing aeroponic systems. Additionally, locating the air pump 141 exteriorly of the housing 110 prevents an increase in temperature within the housing interior 109, resulting from heat generated during operation of the air pump 141. This solves a disadvantage of many existing aeroponic systems, wherein heat generated by an air pump or the like increases the likelihood for undesirable bacterial growth and reduces the degree of operator control of plant growth. Furthermore, recycling the nutrient-rich water 102 greatly reduces the frequency with which nutrient-rich water 102 must be replenished within the housing 110.

Referring now primarily to FIGS. 5 through 8, in accordance with an alternate implementation of the present invention, a low pressure aeroponic recycling system 200 is provided having numerous features in common with the aeroponic recycling system 100 shown in FIGS. 1 through 4. Similar components, structural features, and characteristics of recycling system 200 have been numbered using the same two-digit suffix, but with the similar components shown in FIGS. 5 through 8 assigned reference characters preceded by the numeral "2" in place of the numeral "1."

Significantly, in accordance with this the alternate implementation of the aeroponic recycling mister system 200, the openings, or apertures 125, extending through the bottom side 124 of the housing 110 of the system 100 shown in FIGS. 1-4 have been completely eliminated. Advantageously, by precluding the need to incorporate apertures through the bottom 224 of the housing 210, the fluid integrity of the housing 210 is better maintained, thereby reducing the likelihood of the nutrient-rich water solution 202 leaking from the interior 209 of housing 210.

Figure 6:
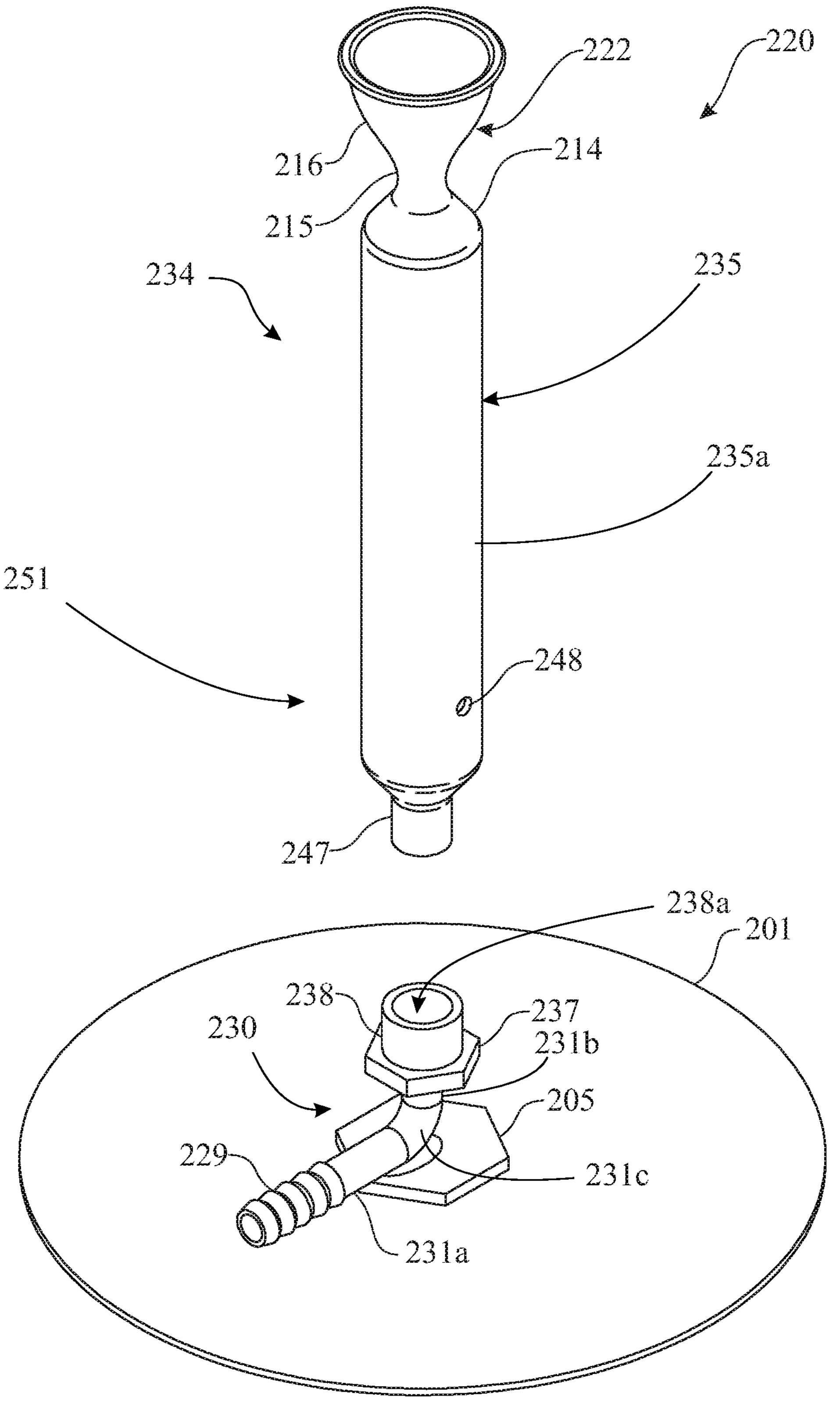
FIG. 6 presents an exploded isometric view of a nozzle used in the alternate embodiment aeroponic recycling system of FIG. 5.
Figure 7:
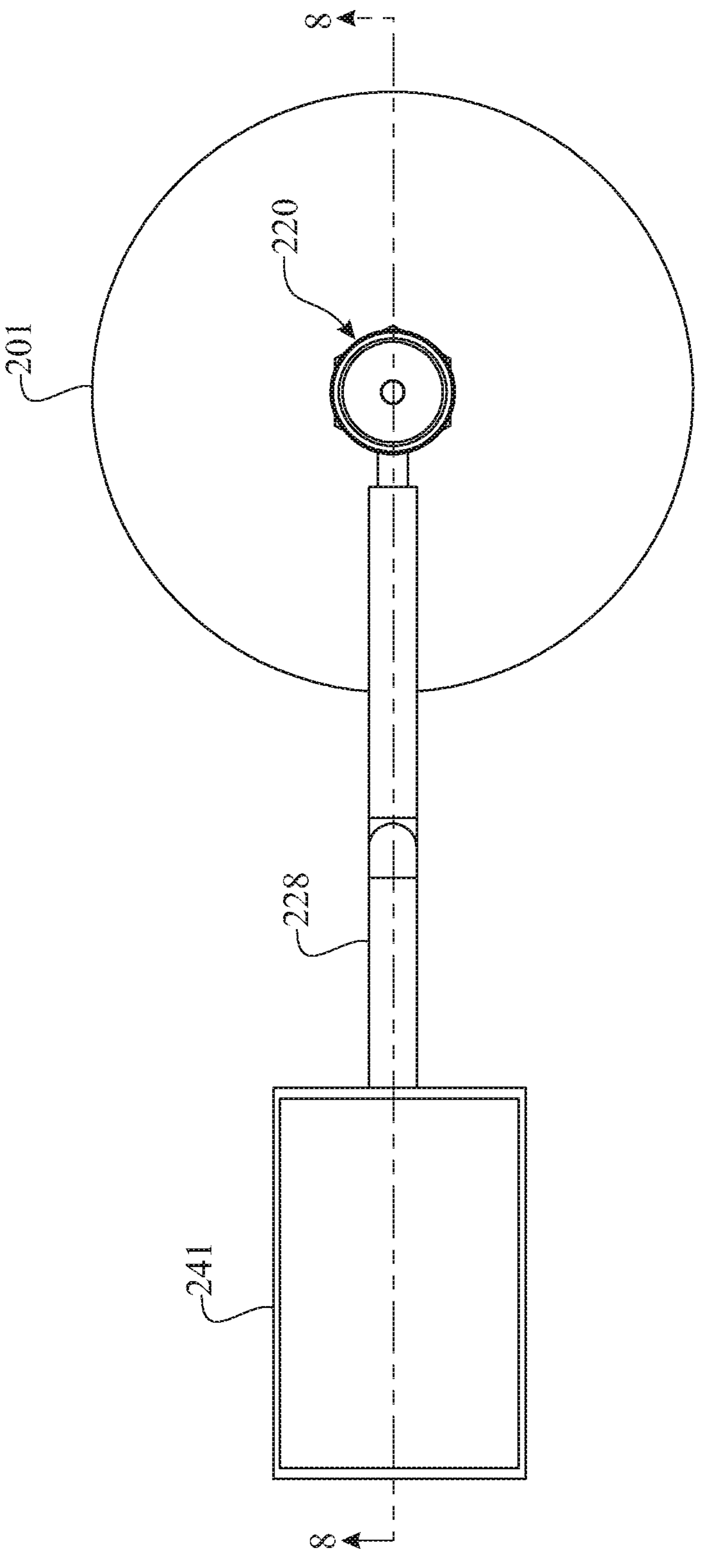
FIG. 7 presents a top plan view of air pump and nozzle of the alternate embodiment aeroponic recycling system of FIG. 5.

The misting subassembly, or mister 220, preferably includes a stabilizing plate 201 having a diameter significantly greater than a corresponding diameter of the cylindrical expansion chamber 234 of the mister 220, as best shown in FIG. 6. A flat tab 205 is preferably provided protruding upwardly from a central area of an upper surface of the stabilizing plate 201. The flat tab 205 may be provided in the form of an integral portion underlying a length of an air inlet tube 230 (e.g., where the flat tab and the air inlet tube are portions of a unitary, or one-piece, molded component), or, alternatively, the flat tab may be provided as a separate, independent, component affixed to air inlet tube 230. The air inlet conduit or tube 230 is preferably bent at a ninety-degree (90°) angle, wherein a horizontally-oriented distal end portion incorporates a length of a connection barb 229, and transitions via inlet tube bend 231 to a vertically-oriented opposite end portion of the inlet tube 230, which terminates at a flange 237 extending radially outward from a bottom end of a cylindrically-walled female fitting 238. A cavity 238*a* extends into the female fitting and is defined by an inner diameter of the cylindrical sidewall of the female fitting 238. The internal diameter of the cavity 238*a* of the female fitting 238 may be nominally greater than a corresponding exterior diameter of a lower air inlet 247 of the expansion chamber 234 to facilitate a friction fit of the lower air inlet 247 into the cylindrical cavity 238*a* of the female fitting 238. The female fitting 238 and the expansion chamber 234, including the expansion chamber air inlet 247, can be comprised of a plastic, such as PVC, and can be bonded one to the other, for example, by a known chemical or thermal welding process, to create a connection that is impervious to fluid leakage while maintaining an uninterrupted internal fluid flow. The expansion chamber 234 and the nozzle 222 of aeroponic misting apparatus 220 are preferably configured substantially identical to the corresponding expansion chamber 134 and nozzle 122 of the aeroponic misting apparatus 100; accordingly, a repeat of the description thereof is not being provided for the sake of brevity.

Figure 5:
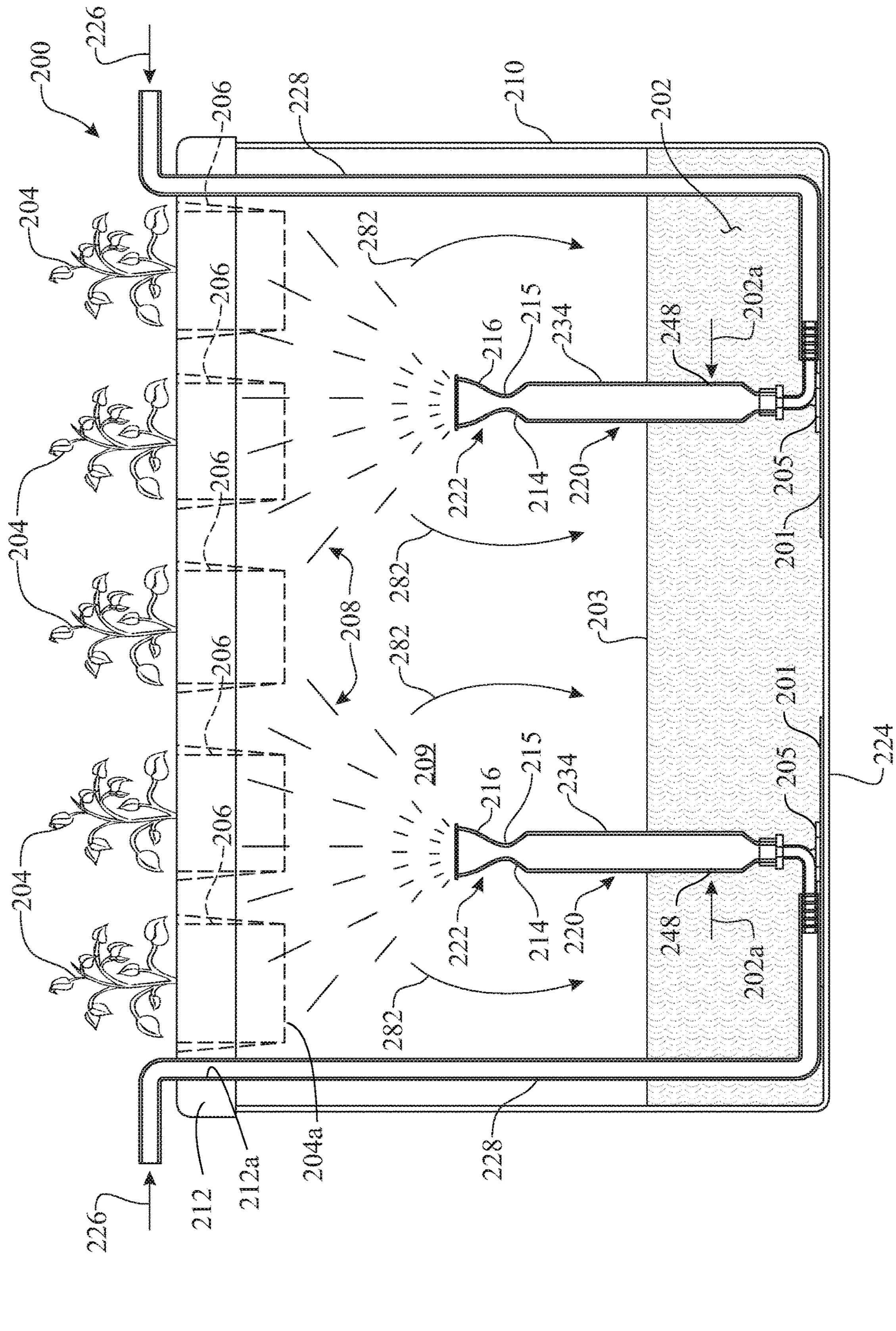
FIG. 5 presents an elevation view of an alternate embodiment aeroponic system wherein the air lines for feeding the nozzles enter the housing over a top rim of the housing.
Figure 8:
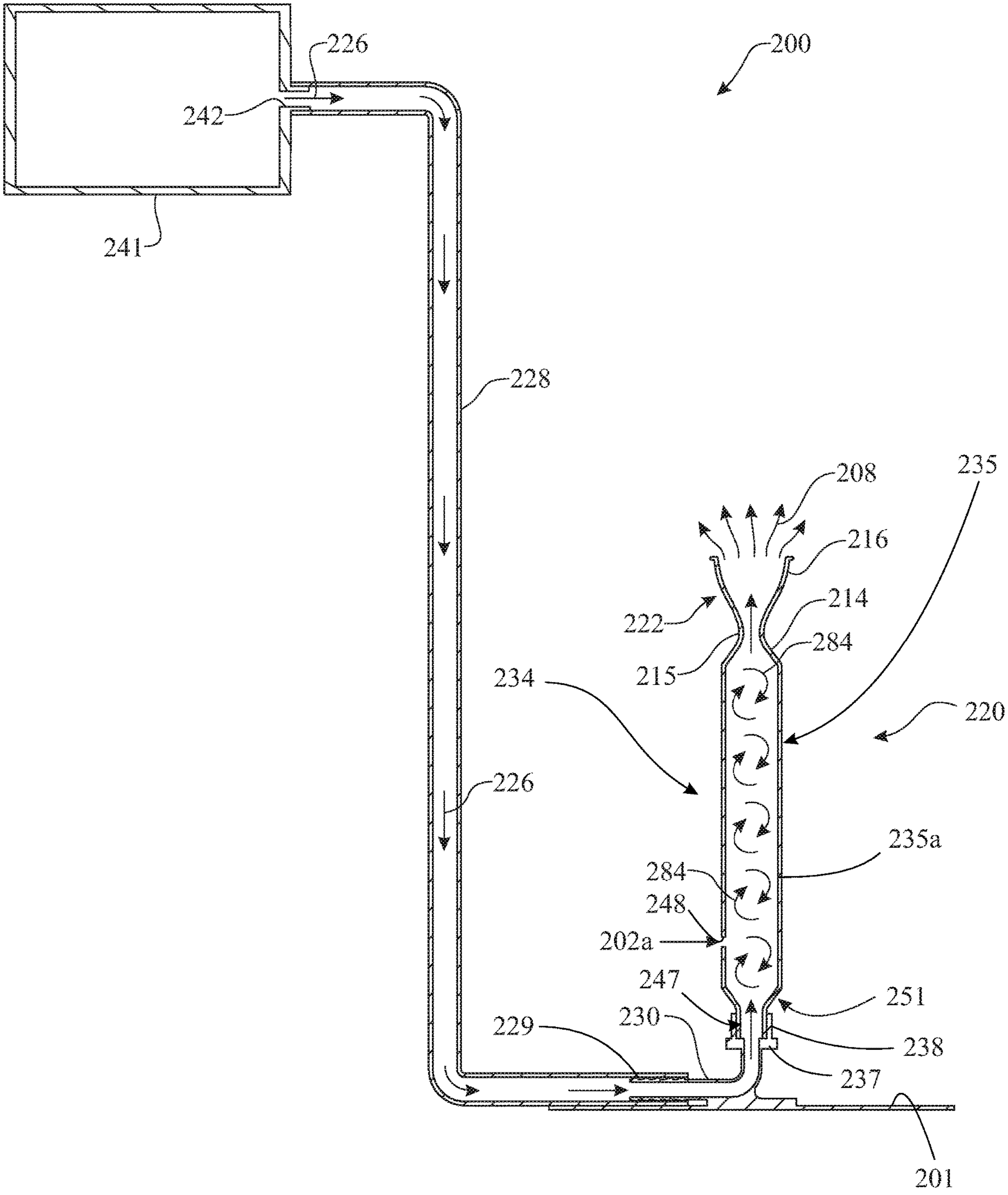
FIG. 8 presents a cross-sectional elevation view of air pump and nozzle shown in FIG. 7, the section being taken along section line 8-8 of FIG. 7.

In operation, the aeroponic recycling system 200 is arranged such that the air tube 228 is of a sufficient length for the air pump 241 to be mounted, or otherwise maintained, externally from the housing 210, and raised such that the air pump outlet 242, where airflow 226 generated by the pump is introduced into the airflow conduit, also referred to herein as the "air tube," is maintained at a height a distance above the nozzles 222 of the respective misters 220, as best shown in FIGS. 5 and 8. The air tube 228 may extend, or be draped, over a top rim of the housing 210 upon which the removable top 212 is seated, and more precisely through an aperture 212*a* extending through removable top 212, while the individual spaced aeroponic misters 220 are supported upon an upper, interior surface of the bottom 224 of the housing 210. Advantageously, in accordance with this particular implementation of the aeroponic recycling system 200, since the individual aeroponic misters 220 do not have to be secured through predefined aperture locations in the bottom 224 of the housing 210, the aeroponic misters 220 may be selectively positioned, by a system user, at precise locations that are most advantageous for optimizing the coverage of the mist 208 on the root structures 204*a* of the plants 204 extending into the interior space 209 of housing 210. Furthermore, with the air tube 228 extending over the top rim of the housing 210, any nutrient-rich water solution 202 collected at a bottom of an individual one of the misters 220, via its water inlet aperture 248, will not backflow into the air pump 241.

Airflow 226 is generated by the air pump 241, which evacuates any water solution 202 that has accumulated in the misters 220 and the air tubes 228. After start-up and evacuation of accumulated water solution 202, a constant airflow 226 is maintained by the air pump 241. The water inlet aperture 248 permits a controlled quantity of water solution 202 introduced into the main body 235 of expansion chamber 234. A diameter of the water inlet aperture 248 controls the volumetric flow of the water solution 202 in a manner known in the fluid dynamics field. Initially, the flow of air through airflow conduit 228 is best described as a constant flow of air traveling in a linear direction through the airflow conduit 228 as indicated by directional reference arrows 226 (FIG. 8). As the airflow 226 is communicated from the inlet tube 230 through the expansion chamber inlet 247, the direction of the airflow 226 changes from a constant, linear airflow to a swirling airflow as indicated by airflow directional reference arrows 226. More specifically, the airflow begins to form a swirl pattern, as indicated by arrows 284 (FIG. 8), and intermixes with the controlled inflow of nutrient-filled water solution 202 entering through the water inlet aperture 248. The combined air from the swirling airflow 226 and nutrient-rich water solution 202 introduced through the water inlet aperture 248 creates a mixture that continues traveling upwards vertically through the expansion chamber 234 to the nozzle 222. The combined airflow 226 and water solution 202 enters the convergent inlet 214 of the nozzle 222 and flows through the nozzle throat 215, where the velocity of the mixture flow is increased and the flow pressure decreased in accordance with the Venturi effect. As is well known in the field of fluid dynamics, the Venturi effect is the reduction in fluid pressure that results when a fluid flows through a constricted section (or choke) of a pipe. An incompressible fluid's velocity must increase as it passes through a constriction in accord with the principle of mass continuity, while its static pressure must decrease in accord with the principle of conservation of mechanical energy. Thus, any gain in kinetic energy a fluid may accrue due to its increased velocity through a constriction is balanced by a drop in pressure. The passage of the flow through the throat 215 and then into the divergent misting discharge orifice 216 causes the creation of a mist 208 comprised of the airflow 226 and interspersed small droplets of the nutrient-filled water solution 202. The mist 208 is vertically directed in the form of an inverted conical pattern toward the exposed root structures 204*a* of the plants 204, which absorb the mist 208 and, thereby, provide the plants 204 with the nutrients needed for optimal plant growth. The excess nutrient-rich water solution 202 from the mist 208 descends, or falls back down toward the bottom 224 of the housing 210, as illustrated by arrows 282 (FIG. 5), where it remixes with the quantity, or body, of nutrient rich water 102 for recycled usage by the system 200.

Figure 9:
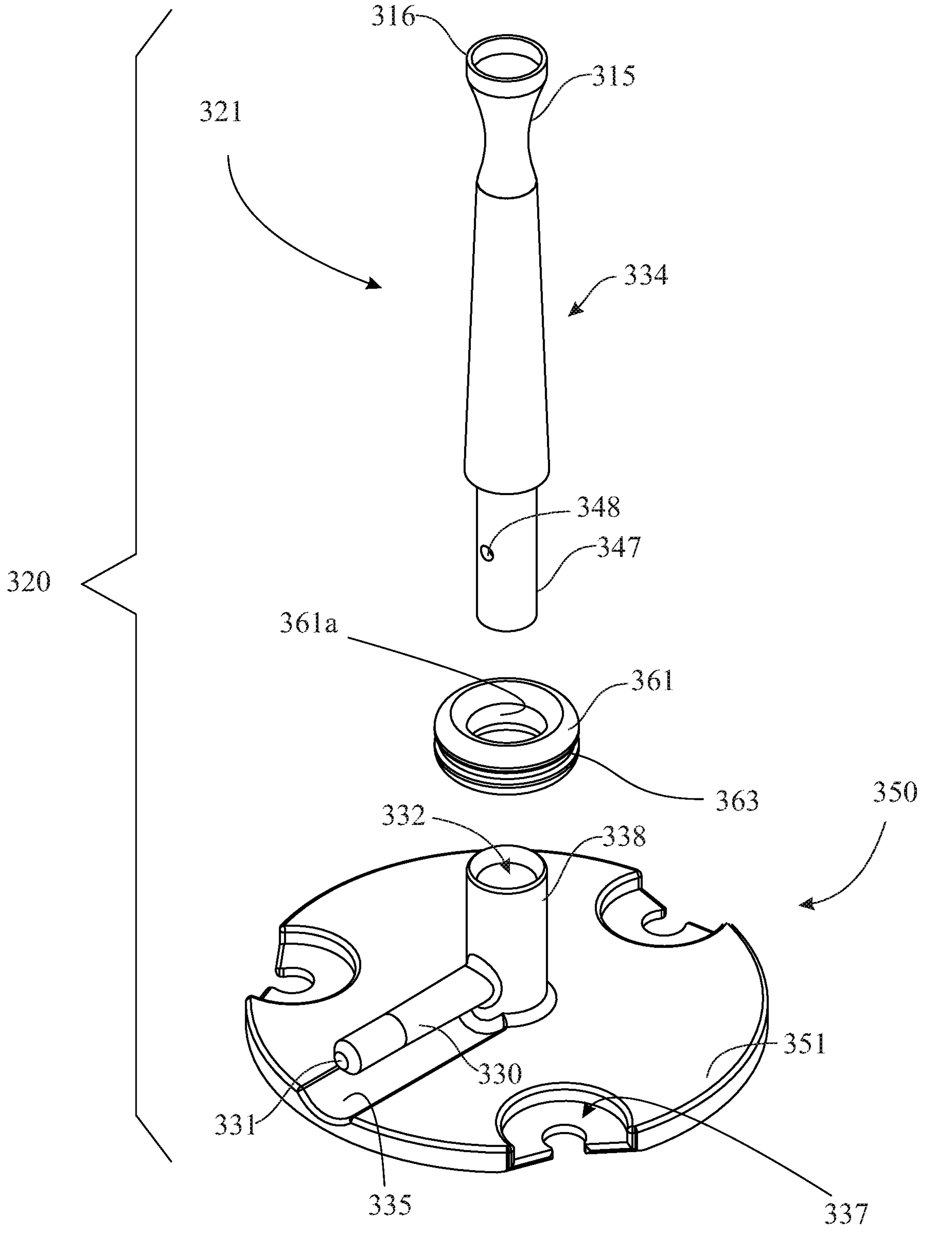
FIG. 9 presents an exploded view of an alternate implementation of a mister apparatus utilized for misting the root structure in an aeroponic recycling system.
Figure 10:
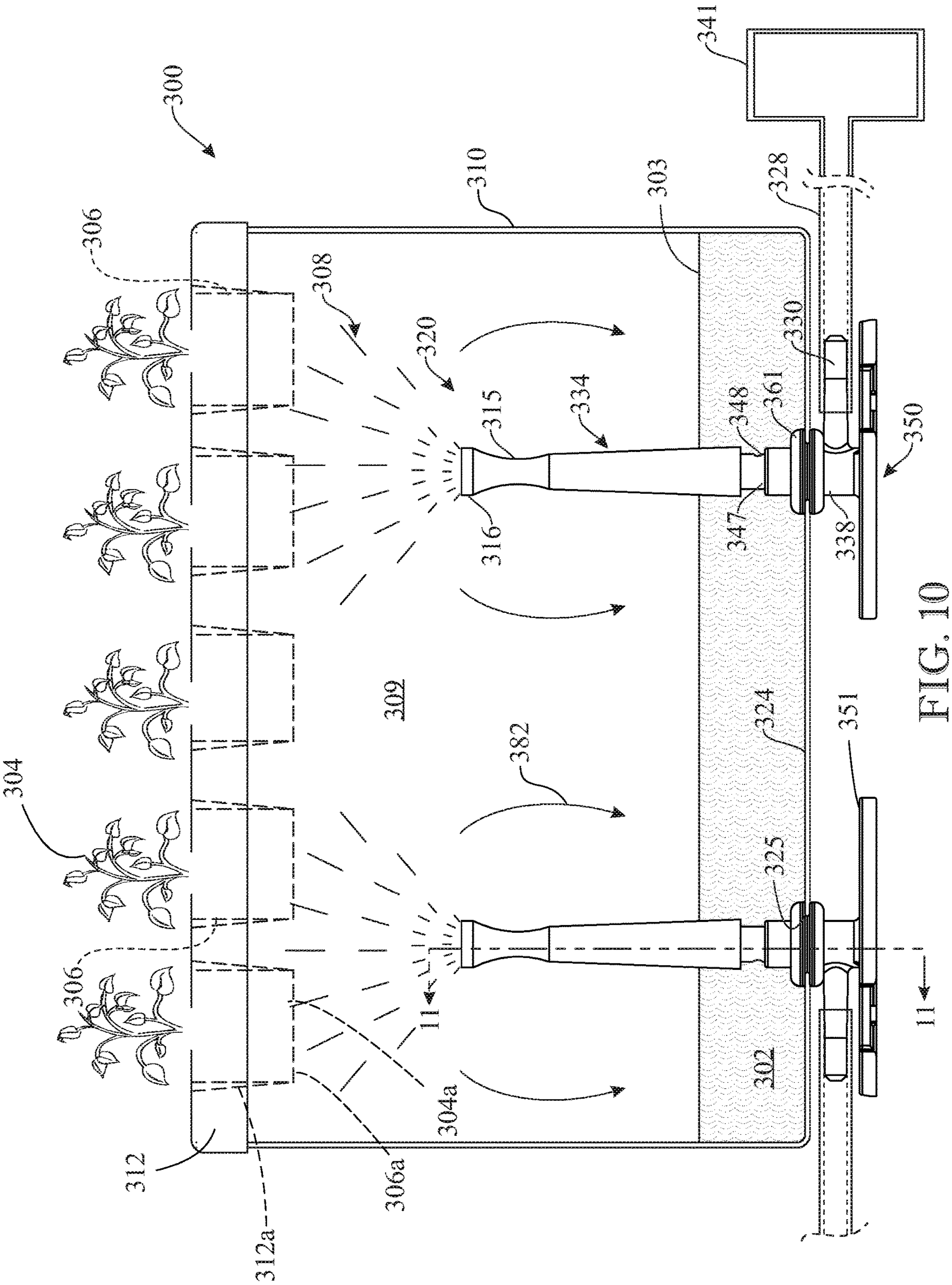
FIG. 10 presents an elevation view of the alternate implementation of the mister apparatus of FIG. 9, wherein the mister is positioned in an aeroponic housing structure used for misting the root structure of plants suspended at a top portion of the housing structure.
Figure 11:
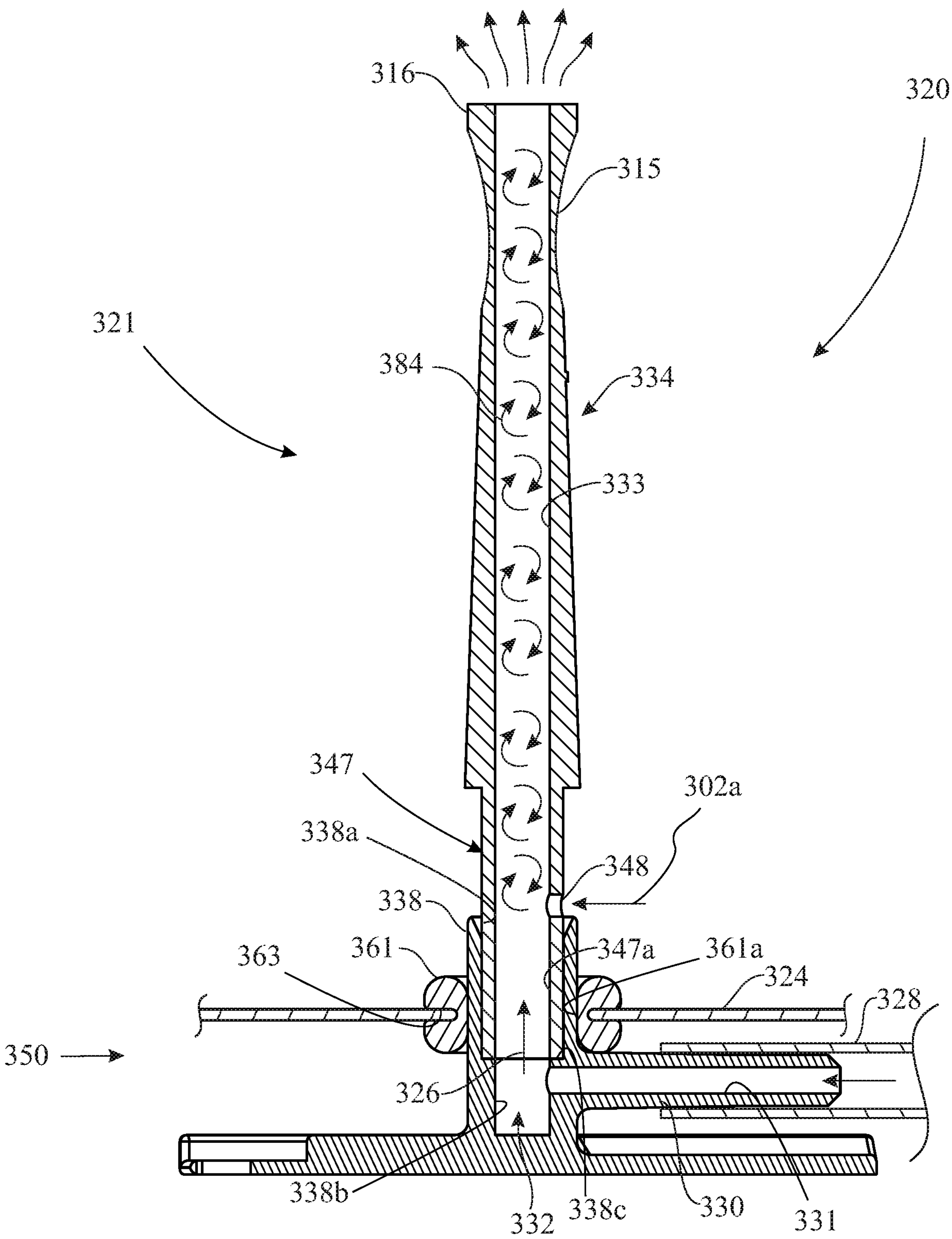
FIG. 11 is a cross-sectional view of the misting apparatus of FIG. 9, the section being taken along section line 11-11 of FIG. 10.

Referring now primarily to FIGS. 9-11, in accordance with a most preferred implementation, an aeroponic recycling system is provided—identified generally by reference numeral 300 (FIG. 10) incorporating, among other things, a modified mister, or misting apparatus 320. For the purpose of convenience and clarity, features that recycling system 300 has in common with the the previously-described and shown aeroponic recycling systems, 100 (FIGS. 1-4) and 200 (FIGS. 5-8), have been identified in accompanying FIGS. 9-11 using identical three-digit reference numerals, except that, where possible, the components associated with aeroponic recycling system 300 have been numbered using the same two-digit suffix, but preceded by the numeric prefix "3" in place of the respective prefix numerals "1" and "2."

There are a variety of key structural, assembly-related, functional and characteristic features associated with the aeroponic recycling system shown in FIGS. 9-11; generally identified herein by reference character 300. One significant feature pertains to the general configuration of the misting apparatus 320, and the means by which the individual misters 320 are integrated with the bottom side 324 of the housing 310 through corresponding bottom side apertures 325. Another significant distinguishing feature relates to the mixing chamber 334, which, unlike the expansion chambers 134 (FIGS. 1-4) and 234 (FIGS. 5-8), incorporates a uniform diameter central channel 333 (FIG. 11), i.e., in lieu of the various convergent and divergent portions along the aeroponic misting subassemblies, 120 and 220, associated with the respective aeroponic system implementations, 100 and 200, shown in FIGS. 1-8. For example, significantly, mixing chamber 334 incorporates a uniform diameter passageway; resulting in the elimination of the narrowing of the internal diameter of the interior cavity 333, or passageway, through the lower inlet chamber 347, and the external neck, or throat, portion 315, as well as the elimination of the expansion of the internal diameter of the interior cavity 333 proximate to the misting discharge orifice 316, as best shown in FIG. 11. In particular, a reduced exterior diameter inlet chamber 347 of aeroponic mister body 321 is coupled to a vertically-oriented cylindrical post 338 having a contiguous central channel, or cavity 332, extending downwardly from an upper post opening and terminating at an upper surface of a misting apparatus base, identified generally by reference character 350. More precisely, as will be best understood with reference to FIG. 11, an external diameter of lower nutrient-filled water inlet chamber 347 is nominally less than a corresponding internal diameter of an upper length of post 338. Furthermore, post 338 incorporates a first internal diameter 338*a* along an upper post portion, a second, reduced, internal diameter 338*b* along a lower post portion, and an adjoining shoulder 338*c*. In this manner, the shoulder 338*c* engages the lower edge of inlet chamber 347 to function as a vertical stop limit feature. The location of the water inlet aperture 348 in this implementation—vis-à-vis the previously described and shown aeroponic misting systems 100, 200—has been relocated from the mixing chamber 334 into the inlet chamber 347 to enable and facilitate improved user control over the inflow of nutrient-rich water solution 302*a* trickling into the mixing chamber 334 of the mister 320.

As most clearly shown in FIG. 9, the mister apparatus 320 generally includes: (a) a misting apparatus base, identified generally by reference number 350, which functions as an air intake portion of low pressure aeroponic misting apparatus 320; (b) an aeroponic mister body 321 configured for engagement with the misting apparatus base 350; and (c) a toroidal resilient sealing member 361 circumscribing a post member 338 of the base 350, and, as best shown in FIG. 10, cooperates with a corresponding aperture 325 extending completely through the bottom side 324 of the housing 310 to securely attach the misting apparatus to the housing 310 with the aeroponic misting body 321 maintained in an upright orientation within the housing interior 309 and the aperture 325 fully sealed. A circular stabilizing base plate 351 is provided having a diameter substantially greater than the exterior diameter of the misting apparatus mixing chamber 334. A cylindrical post member 338 is provided extending upwardly from a central area of an upper surface of the base plate 351, and has a cantilevered air inlet tube 330 extending outwardly, preferably at a ninety-degree (90°) angle, from the post member 338 (i.e. in a horizontal orientation). The air inlet tube 330 includes a central, preferably cylindrical, passageway 331 in fluid communication with a post interior channel 332 defined by an inner diameter of a lower portion of post 338. A linear concave channel 335, or groove, may be provided in the upper surface of the base plate 351 directly below cantilevered air inlet tube 330 to accommodate air tube 328 (FIG. 10), if necessary. Furthermore, horseshoe-shaped, or C-shaped, depressions 337 may be provided in the upper surface of base plate 351 to accommodate mechanical fastening elements and respective fastener element heads (not shown) if desired to secure the base 350 to an underlying support surface (not shown).

The interior cavity 332, alternatively referred to as a channel, of a lower vertical portion of post 338 has a first internal diameter, and an integral upper portion of the post has a second diameter, greater than the first diameter and adjoined to the first diameter via post interior shoulder 339. As stated above, the second interior diameter is nominally greater than the exterior diameter of the reduced diameter distal end portion of lower air inlet chamber 347 to snugly receive a distal end portion of the inlet chamber 347 that is connected to the mixing chamber 334 of the mister 320. The mister 320 can be constructed from a plastic, rubber, metal, or any other suitable material that can be adequately bonded to other components, such as the post 338 of the base portion 350 by, for example, known chemical bonding, thermal welding or frictional means to create a communicatively fluid connection that is impervious to fluid leakage while preserving and maintaining an internal uninterrupted flow of fluid (e.g. air). Again, unlike the mixing chamber and neck/nozzle configuration shown and described with respect to the mister employed in the aeroponic mister systems 100, 200 described above, mister apparatus 320 does not incorporate a narrowing internal passageway of its interior cavity 333. To the contrary, the diameter of the interior cavity 333 along the entire length of the inlet chamber 347 and mixing chamber 334 is uniform.

Referring now particularly to FIG. 10, during operation the aeroponic recycling system 300 is configured with at least one aeroponic mister 320 integrated with the housing 310 through an aperture 325 extending completely through a bottom side 324, in such a manner that the aeroponic mister 320 is maintained vertically-oriented and extending upwardly from the bottom 324 of the housing 300. One or more containers 306 are provided, each containing at least one plant 304 in such a manner that the roots of each plant 304 are left exposed within an interior portion 309 of the housing 300. Each mister 320 may extend upwardly through a corresponding housing body aperture 325. A sealing member 361, such as an annular-shaped resilient grommet, is preferably used to prevent leakage of the nutrient-rich water solution 302 from the interior 109 of the housing 300. Preferably, each sealing member 361 has a toroidal geometry incorporating a horizontally-oriented peripheral channel for facilitating seating of the sealing member 361 within a corresponding housing body aperture 325. As best shown in FIG. 11, post 338 of base 350 is subsequently received through a central sealing member opening 361*a* such that compression of the sealing member between an exterior surface of post 338 and an edge defining housing body aperture 325 creates a highly effective seal. Subsequently, inlet chamber 347 is frictionally secured, or press fit, within the central opening of post 338. The compressible, resilient sealing grommet 361 may be constructed from any material having resilient properties for imparting the aforementioned desirable sealing characteristics. As best shown in FIG. 10, a quantity, or volume, of nutrient-rich water solution 302 inside of the housing 310 is maintained such that the surface 303 of the water solution remains at a level above the water inlet aperture 348 and below the discharge orifice 316 of the mister 320. An air pump 341 provides a continuous flow of air and is advantageously located exteriorly of the housing 310, strategically positioned to preclude undesirable backflow of the nutrient-rich water solution 302.

Upon commencement of operation of the system, the pump 341 is turned on and a desired airflow is established adequate to evacuate any nutrient solution that may have accumulated within the mister 320 and/or air tubes 328 of the system 300. Subsequently, a constant airflow rate is set (i.e. by an operator of the system) and maintained via pump 341. Referring briefly to FIG. 11, as airflow is maintained throughout the system, the water inlet aperture 348 extending through the reduced external diameter inlet chamber 347 causes a controlled quantity, or volume, of nutrient-rich water solution 302 to enter the uniform-diameter interior cavity 333 of the mister 320. The diameter of the water inlet aperture 348 affects the volumetric flow of the water solution as the aperture 348 creates what is technically referred to as a "vena contracta" (i.e. a contracted vein). Vena contracta is the point in a fluid stream where the diameter of the stream is the least, and fluid velocity is at its maximum. In the present case, as the nutrient solution fluid flows into and through the water inlet aperture 348 a pressure gradient is created. In particular, the pressure of the liquid nutrient solution flow 302*a* into the aperture 348 of the inlet chamber 347 is greater than the corresponding pressure within the interior of the inlet chamber 347 (i.e. at the inlet chamber interior side of the nutrient solution inlet aperture 348), causing the liquid nutrient solution 302 to trickle in to the inlet chamber 347. As the airflow 326 is communicated through the central passage 331 of the air inlet tube 330 connected to the air tube, or conduit, 328, it mixes with the liquid nutrient solution trickling into the inlet chamber 347 through the aperture 348 to create a mixture of aerated nutrient-rich solution 384. The mixed aerated solution 384 is communicated by the air flow 326 vertically upward through the inlet chamber 347 into the mixing chamber 384, and subsequently evacuated through the discharge orifice 316. As discussed hereinabove, conventional high pressure aeroponic (HPA) systems operate for brief time periods (i.e. commonly on the order of seconds) separated by relatively long time intervals. The present system 300 operates as a low pressure aeroponic (LPA) system, producing a continuous spray of nutrient solution drops in the form of a mist 308 directed toward the exposed plant roots. To reiterate, the evacuated water and nutrient mixture, or nutrient solution 302, is generally in the form of a non-atomized mist 308 comprised of small—but not atomized—droplets of aerated nutrient-rich water solution. Furthermore, the mixture is generally directed in an upward vertical direction in the form of an inverted conical pattern, towards the root structures 304*a* of the plants 304 exposed within the interior 309 of the housing 310, where the mixture contacts, and is partially absorbed by, the roots to provide nutrients to the corresponding plant. In this manner, the system effectively provides the plants 304 with the nutrients needed for controlled, optimal growth. Typically, during the operation of conventional aeroponic misting systems most of the emitted nutrient solution is not captured and absorbed by the exposed roots. In accordance with the present invention, excess nutrient-rich water solution that is not absorbed by a root system falls back into the body, or volume, of nutrient solution 302 at the bottom of the housing 310, as indicated by directional arrows 382, for recycled usage by the system 300.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An aeroponic recycling system for the propagation and growth of plants, comprising:

(a) a housing main body having a planar bottom side and a contiguous sidewall extending vertically upwards from a perimeter of the planar bottom side, the bottom side having upper and lower surfaces and a misting apparatus body receiving aperture extending completely through said bottom side;

(b) a housing top selectively-attachable to said housing main body, the housing top and housing main body, together, defining a watertight housing interior, a body of nutrient-rich liquid solution contained within a bottom portion of said housing interior, the housing top having at least one opening extending therethrough sized and shaped for seating a plant container therein, such that a root structure of a plant carried by said plant container is maintained exposed within the housing interior when said plant container is seated within said at least one housing top opening when the housing top is attached;

(c) at least one aeroponic misting assembly for generating a continuous mist of nutrient-rich liquid solution, and emitting the generated continuous mist of nutrient-rich liquid solution in a direction toward the exposed root structure, such that a volume of the nutrient-rich liquid solution is absorbed by the exposed root structure, while a non-absorbed volume of the emitted mist of nutrient-rich liquid solution descends back into the body of nutrient-rich liquid solution contained within a bottom portion of said housing interior, the at least one aeroponic misting assembly including a longitudinally-extending unitary aeroponic misting body having a misting body length extending from an air inlet at a lower end of the misting body to a discharge orifice at an opposite, upper end of the misting body, a portion of the lower end of the misting body functioning as an inlet chamber, and a portion of the upper end of the misting body functioning as a mixing chamber for mixing air flowing through the misting body with nutrient-rich liquid solution introduced into the misting body, to form the mist of nutrient-rich liquid solution, the inlet chamber having a uniform external diameter extending from said lower end of the misting body to a shoulder defining a transition between the inlet chamber and the mixing chamber, a uniform diameter central channel extending completely through said misting body, and a nutrient-rich liquid solution inlet aperture extending completely through a sidewall of said inlet chamber;

(d) a base portion, including a stabilizing base plate having a planar lower surface, an upper surface, and a peripheral edge adjoining said upper surface and said planar lower surface;

a vertically-oriented cylindrical post member extending upwardly from a central area of the upper surface of said stabilizing base plate, the post member having a central cavity extending therethrough, the central cavity having a uniform diameter extending for a first central cavity length measured from an upper end of the post member to a surface defined by an inwardly-protruding interior central cavity shoulder, the uniform diameter of the first central cavity length transitioning to a reduced uniform diameter extending for a second central cavity length measured from the interior central cavity shoulder surface to a post member interior central cavity bottom surface, the first central cavity length defining an upper post member sidewall, and the second central cavity length defining a lower post member sidewall, the first central cavity length sized and shaped for snugly receiving a lower proximal end of the inlet chamber of the misting body to form an interference fit between the first central cavity length and the received lower proximal end of the inlet chamber of the misting body, said nutrient-rich liquid solution inlet aperture of said inlet chamber located vertically above the post member upper end when the misting body lower end is in contact engagement with the inwardly-protruding interior central cavity shoulder of the post member when the system is in a fully assembled state;

a cantilevered horizontally-oriented longitudinal air inlet tube having a proximal end, a distal end, and a central channel extending completely therethrough, the air inlet tube proximal end extending into an opening in a sidewall of said vertically-oriented cylindrical post member, such that said air inlet tube central channel is in fluid communication with the central cavity of the post member; and (e) an air pump generating and maintaining a constant airflow through an air pump outlet, the air pump outlet interconnected to the distal end of the cantilevered air inlet tube of said base portion via a length of flexible airflow tubing, and generating an airflow pressure adequate to create emission of a non-atomized mist through the misting body discharge orifice against the exposed root structure.

2. The aeroponic recycling system as recited in claim 1, further comprising:

a resilient toroidal sealing member having a central opening and a contiguous external peripheral groove, the resilient toroidal sealing member seated about said post member such that the post member extends completely through the central opening to create a watertight seal between an exterior surface of a cylindrical sidewall of the post member and an internal surface of the resilient toroidal sealing member defining the central opening, and a peripheral edge defining a circular aperture extending through the bottom side of said housing main body received within the contiguous external peripheral groove of the resilient toroidal sealing member to create a watertight seal therebetween, the resilient toroidal sealing member functioning to both form a watertight seal preventing leakage of said nutrient-rich liquid solution from the interior of the housing and to aid in maintaining the post member and, thereby, the misting body in an upright vertical orientation.

3. The An aeroponic recycling system as recited in claim 2, wherein said resilient toroidal sealing member further comprises a bottom surface sealingly engaged against an upper surface of the air inlet tube of said misting apparatus base plate.

4. The An aeroponic recycling system as recited in claim 3, further comprising a length of flexible air tubing having a proximal end sealingly sleeved over the air pump outlet and a distal end sealingly sleeved over the distal end of the air inlet tube of said misting apparatus base plate.

5. The aeroponic recycling system as recited in claim 4, wherein said air pump is located exteriorly of said housing main body.

6. The aeroponic recycling system as recited in claim 1, wherein said at least one aeroponic misting assembly further comprises a plurality of individual aeroponic misting assemblies affixed to said housing main body through a respective plurality of bottom side apertures, in a spaced-apart relationship from one another maximizing coverage of said nutrient-rich liquid solution upon said exposed root structures.

7. The aeroponic recycling system as recited in claim 1, wherein said base portion stabilizing plate upper surface further comprises a linear concave groove provided therein extending directly beneath said air inlet tube.

* * * * *